US012769119B2

(12) United States Patent
Shinobu

(10) Patent No.: US 12,769,119 B2
(45) Date of Patent: Oct. 20, 2026

(54) OPTICAL SYSTEM, DISPLAY APPARATUS, AND IMAGE PICKUP APPARATUS

(71) Applicant: CANON KABUSHIKI KAISHA, Tokyo (JP)

(72) Inventor: Fumihiro Shinobu, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 313 days.

(21) Appl. No.: 18/434,016

(22) Filed: Feb. 6, 2024

(65) Prior Publication Data

US 2024/0272429 A1 Aug. 15, 2024

(30) Foreign Application Priority Data

Feb. 14, 2023 (JP) ................................ 2023-020466

(51) Int. Cl.

| | |
|---|---|
| ***G02B 27/01*** | (2006.01) |
| ***G02B 27/00*** | (2006.01) |
| ***G02B 27/09*** | (2006.01) |
| ***G02B 27/10*** | (2006.01) |

(52) U.S. Cl.
CPC ..... *G02B 27/0101* (2013.01); *G02B 27/0093* (2013.01); *G02B 27/0955* (2013.01); *G02B 27/1006* (2013.01); *G02B 2027/0138* (2013.01)

(58) Field of Classification Search
None
See application file for complete search history.

(56) References Cited

U.S. PATENT DOCUMENTS

2017/0138786 A1* 5/2017 Shimizu ................ G01J 1/0407
2021/0011249 A1* 1/2021 Yokoyama ............... G02B 9/60

FOREIGN PATENT DOCUMENTS

JP 2005215389 A 8/2005
JP 2017026962 A 2/2017

* cited by examiner

*Primary Examiner* — Richard H Kim
(74) *Attorney, Agent, or Firm* — Canon.U.S.A., Inc. IP Division

(57) ABSTRACT

An optical system configured to guide an image displayed on a display element to an eyeball of a viewer includes a resin lens, and a member for reducing transmission of ultraviolet light of the optical system. The member is disposed closer to the viewer than the resin lens. Predetermined inequalities are satisfied.

17 Claims, 5 Drawing Sheets

OPTICAL SYSTEM, DISPLAY APPARATUS, AND IMAGE PICKUP APPARATUS

BACKGROUND

Technical Field

One of the aspects of the embodiments relates to an optical system, a display apparatus, and an image pickup apparatus.

Description of Related Art

A line-of-sight detecting optical system configured to detect a direction of a line of sight of a viewer (observer) has conventionally been known. The line-of-sight detecting optical system detects the line of sight by causing an infrared light source to emit that is invisible to the viewer and by capturing a reflected image so as not to cause discomfort to the viewer. Therefore, for excellent line-of-sight detecting performance, reflected light in the infrared wavelength band is suppressed.

It has been widely known to use a high-dispersion resin lens for an optical system for observing a display element such as a liquid crystal panel in order to achieve high optical performance. However, the high-dispersion resin lens is inferior to a glass lens in resistance performance against ultraviolet (UV) light and must be protected by a UV light reducer in order to achieve high reliability. Each of Japanese Patent Laid-Open Nos. 2005-215389 and 2017-26962 discloses an optical system that has improved light resistance of a resin lens using a UV light reducer.

The UV light reducers disclosed in Japanese Patent Laid-Open Nos. 2005-215389 and 2017-26962 are intended to be used only in the UV and visible regions, and have a high reflectance in the infrared (IR) region or are not intended for use in the IR region. In a viewfinder optical system that has a line-of-sight detecting function using IR light, increasing the reflectance in the IR region decreases the detection accuracy. Furthermore, in general, a steep cutoff wavelength set in the UV region tends to increase the reflectance in the IR region, and thus a viewfinder optical system having a line-of-sight detecting function must be properly configured.

SUMMARY

An optical system according to one aspect of the disclosure configured to guide an image displayed on a display element to an eyeball of a viewer includes a resin lens, and a member for reducing transmission of ultraviolet light of the optical system. The member is disposed closer to the viewer than the resin lens. The following inequalities are satisfied:

$$0 < Tuv < 10$$

$$0 < Rir < 10$$

where Tuv [%] is an average transmittance of the ultraviolet light reducer at a wavelength of 300 to 360 nm, and Rir [%] is an average reflectance at a wavelength of 700 to 1000 nm. A display apparatus and an image pickup apparatus each having the above optical system also constitute another aspect of the embodiment.

Further features of various embodiments of the disclosure will become apparent from the following description of embodiments with reference to the attached drawings.

DESCRIPTION OF THE EMBODIMENTS

Referring now to the accompanying drawings, a detailed description will be given of embodiments according to the disclosure.

An optical system (viewfinder optical system) according to each example has a plurality of lenses arranged in order from the object side (display surface side) to the observation side (pupil surface side), and includes a resin lens P and a UV light reducer S. The resin lens P is a lens made of a resin material, and is not limited to a lens made only of resin, but may contain another material as long as the lens contains a resin as a main material.

Figure 1:
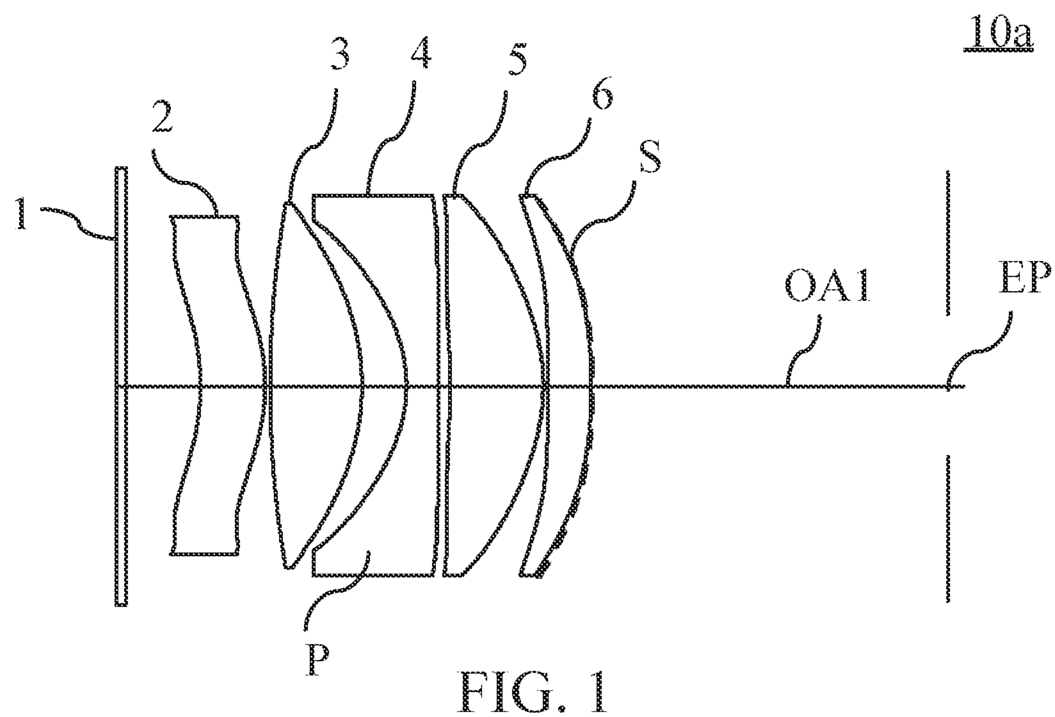
FIG. 1 is a sectional view of an optical system according to Example 1.
Figure 2:
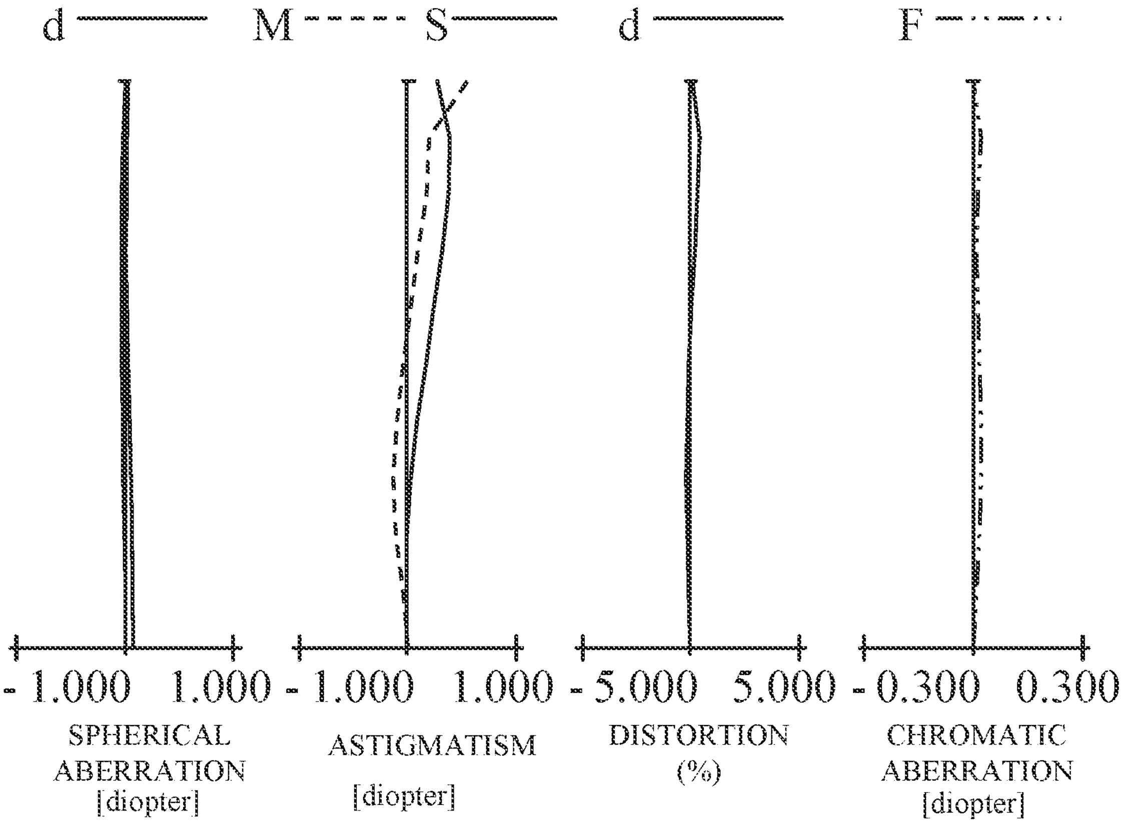
FIG. 2 is an aberration diagram of the optical system according to Example 1.
Figure 3:
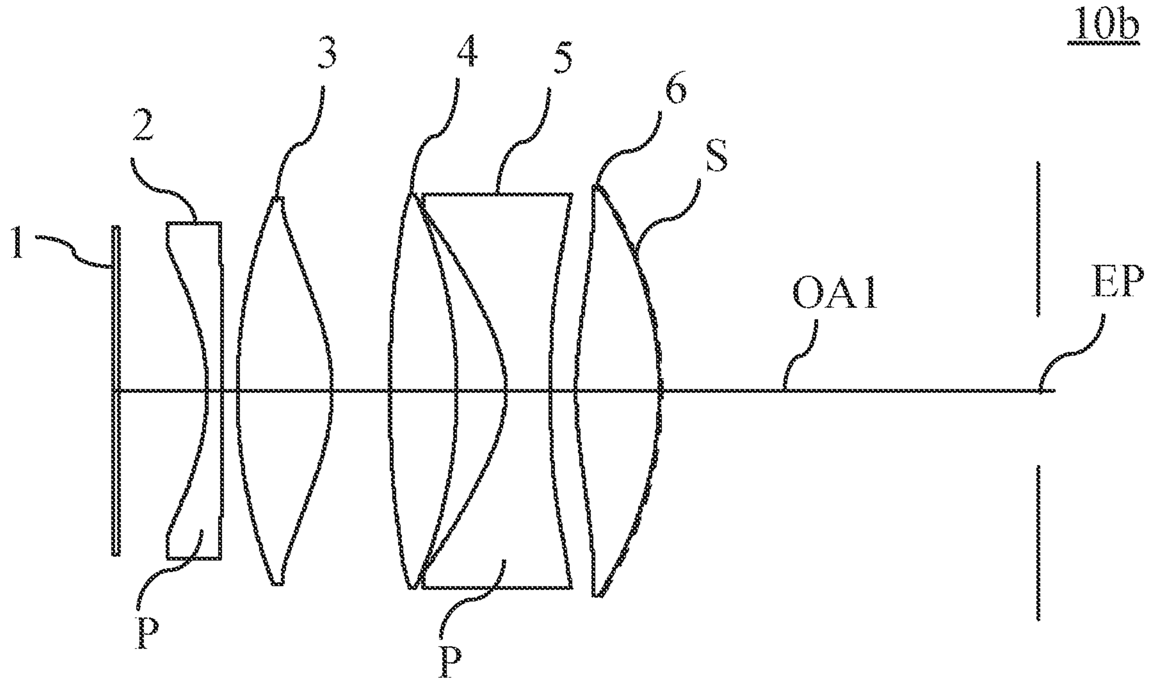
FIG. 3 is a sectional view of an optical system according to Example 2.
Figure 4:
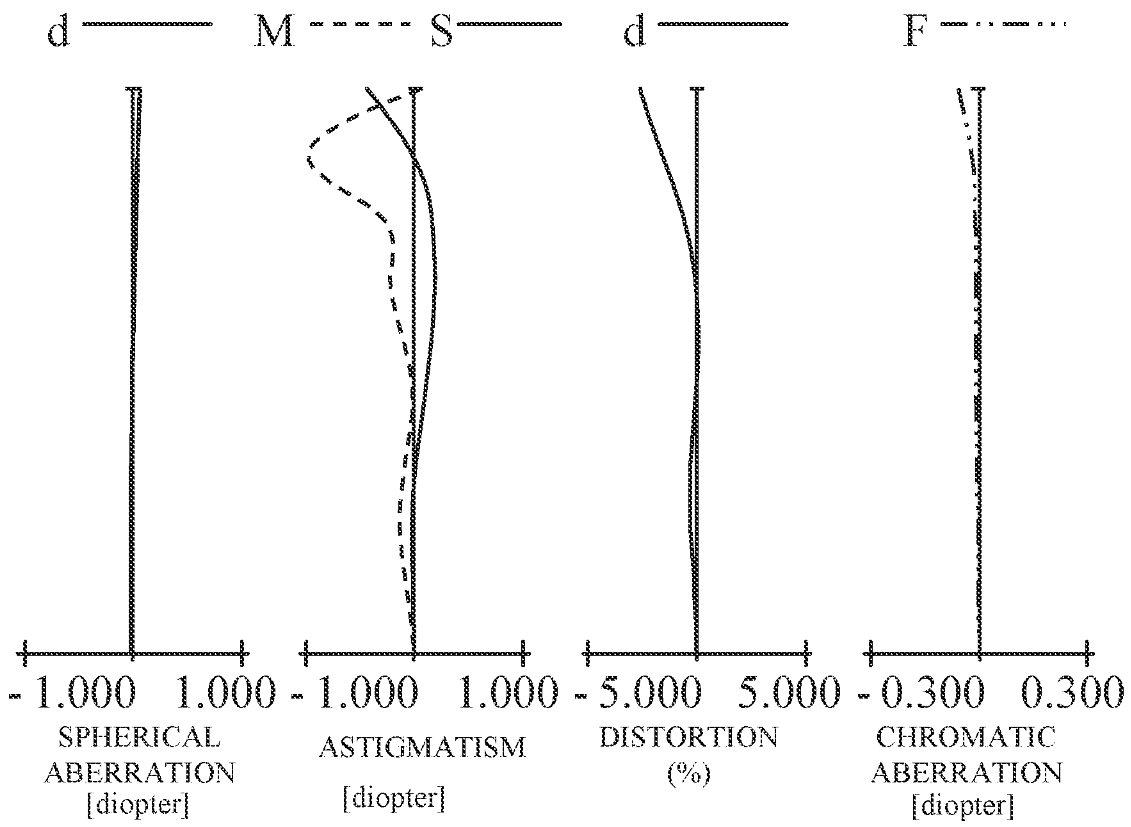
FIG. 4 is an aberration diagram of the optical system according to Example 2.
Figure 5:
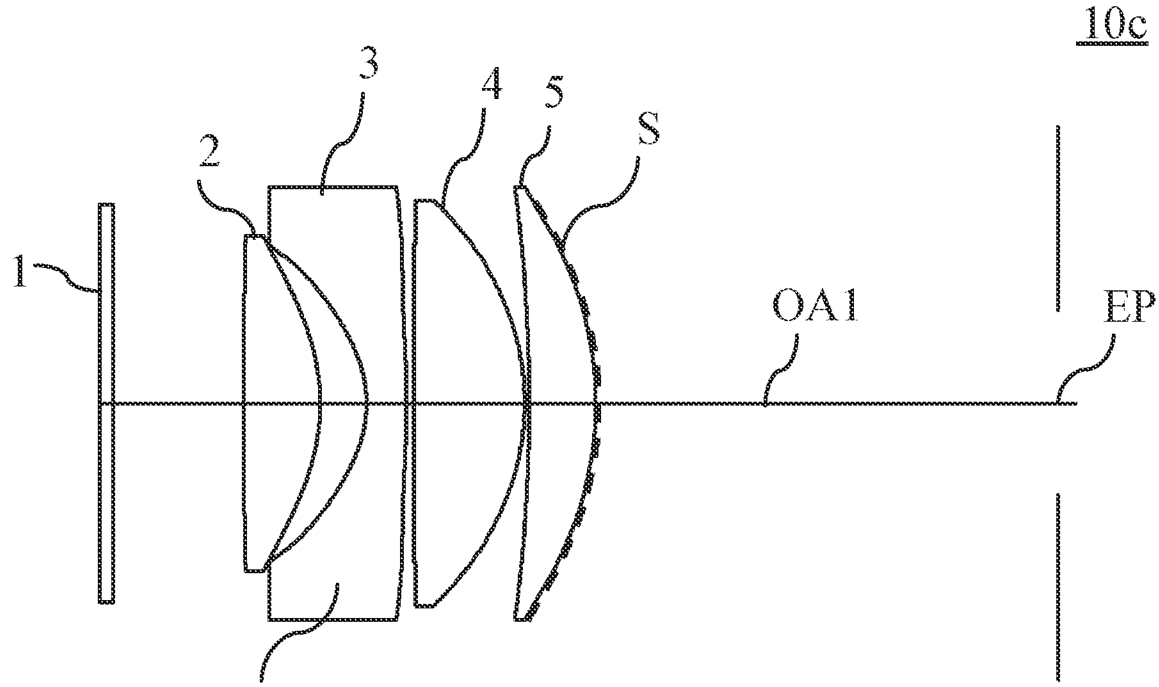
FIG. 5 is a sectional view of an optical system according to Example 3.
Figure 6:
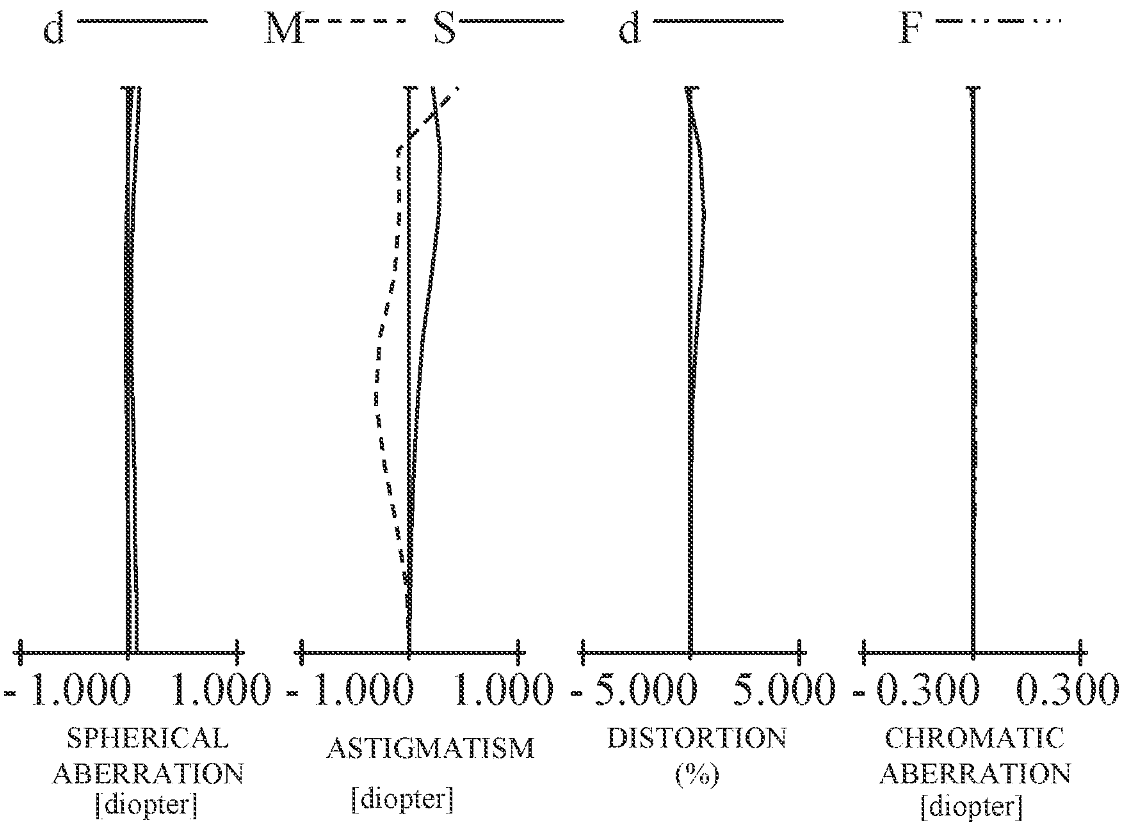
FIG. 6 is an aberration diagram of the optical system according to Example 3.

FIG. 1 is a sectional view of an optical system 10*a* according to Example 1 (numerical example 1) at a diopter of −1.0 diopter (standard diopter). FIG. 2 is an aberration diagram of the optical system 10*a* in the standard diopter. FIG. 3 is a sectional view of an optical system 10*b* according to Example 2 at a diopter of −1.0 diopter (standard diopter). FIG. 4 is an aberration diagram of the optical system 10*b* at the standard diopter. FIG. 5 is a sectional view of an optical system 10*c* according to Example 3 at a diopter of −1.0 diopter (standard diopter). FIG. 6 is an aberration diagram of the optical system 10*c* at the standard diopter.

In each sectional view, reference numeral 1 denotes an image display element (display element), reference numeral 2 denotes a first lens in each optical system, reference numeral 3 denotes a second lens in each optical system, reference numeral 4 denotes a third lens in each optical system, reference numeral 5 denotes a fourth lens in each optical system, and reference numeral 6 denotes a fifth lens in each optical system. In each sectional view, P represents the resin lens, S represents the ultraviolet (UV) light reducer that is a member for reducing transmission of ultraviolet (UV) light of the optical system, and EP represents an eyepoint position (pupil plane) on the observation side. Although not illustrated in each sectional view, each optical system has a line-of-sight detecting function that includes an imaging unit (see FIG. 9) that images the viewer's eyeball using infrared (IR) light, and detects the direction of the viewer's line of sight for use with autofocus (AF) or auto-exposure setting.

In each aberration diagram, a spherical aberration diagram illustrates a spherical aberration amount for the d-line (wavelength 587.56 nm). In an astigmatism diagram, S represents a curvature of field amount on a sagittal image plane, and M represents a curvature of field amount on the meridional image plane. A distortion aberration illustrates a distortion amount for the d-line. A chromatic aberration diagram illustrates a chromatic aberration amount for the F-line (wavelength 486.13 nm).

For high visibility, a sufficiently wide field of view (high magnification), a long eye relief, and properly corrected aberrations, a plurality of lenses including the resin lens P is to be properly disposed. Since the resin lens P deteriorates due to UV light and its transmittance changes, the UV light reducer S is used to improve reliability. On the other hand, reflected light of the IR light is to be suppressed for excellent line-of-sight detecting performance.

Accordingly, the optical system according to each example is an optical system (viewfinder optical system) configured to guide an image displayed on the image display element 1 to the viewer's eyeball, and includes the resin lens P and the UV light reducer S disposed closer to the viewer than the resin lens P and configured to reduce the transmission of UV light. Each example satisfies the following inequalities (1) and (2):

$$0 < Tuv < 10 \quad (1)$$

$$0 < Rir < 10 \quad (2)$$

where Tuv [%] is the average transmittance of the UV light reducer S in the wavelength range of 300 to 360 nm, and Rir [%] is the average reflectance of the wavelength of 700 to 1000 nm.

Thereby, each example optical system has an excellent line-of-sight detecting function, and achieves high optical performance and high reliability. Inequality (1) is an inequality to improve the environmental resistance of the resin lens P. In a case where the value falls outside the range of inequality (1), the visibility as a viewfinder optical system deteriorates, such as the transmittance fluctuations of the resin lens P. Inequality (2) is an inequality to realize an excellent line-of-sight detecting function. In a case where the value falls outside the range of inequality (2), ghost light in the IR region lowers the accuracy of the line-of-sight detecting function.

Inequalities (1) and (2) may be replaced with the following inequalities (1a) and (2a), respectively:

$$0 < Tuv < 9 \quad (1a)$$

$$0 < Rir < 9 \quad (2a)$$

Inequalities (1) and (2) may be replaced with the following inequalities (1b) and (2b), respectively:

$$0 < Tuv < 8 \quad (1b)$$

-continued $$0 < Rir < 8 \quad (2b)$$

Each example may satisfy at least one of the following inequalities (3) to (7):

$$0 < Tvl < 10 \quad (3)$$

$$-1.00 < h*EP/(Re*f) < 0.50 \quad (4)$$

$$0.5 < fuv/f < 10.0 \quad (5)$$

$$1.60 < ndp < 1.75 \quad (6)$$

$$15.0 < vdp < 25.0 \quad (7)$$

Here, Tvl [%] is the average reflectance of the UV light reducer S at a wavelength of 400 to 700 nm. Re is the curvature of the surface on which the UV light reducer S is provided. f is a focal length of the entire optical system. h is a diagonal length of the display surface of the image display element 1. EP is an eyepoint distance of the optical system. fuv is a focal length of the optical member including the UV light reducer S. ndp is the refractive index of the resin lens P for the d-line. vdp is the Abbe number of the resin lens P for the d-line.

A description will now be given of the technical meanings of inequalities (3) to (7). Inequality (3) is an inequality to secure excellent visibility of the optical system. In a case where the value becomes higher than the upper limit of inequality (3), ghosts increase in the field and the visibility of the optical system deteriorates.

Inequality (4) is an inequality to achieve both excellent optical performance of the optical system and the characteristic of the UV light reducer S. In a case where the value becomes higher than the upper limit of inequality (4), the curvature of the surface on which the UV light reducer S is provided becomes stronger in the concave direction, and the substantial eyepoint distance becomes short. On the other hand, in a case where the value becomes lower than the lower limit of inequality (4), the curvature of the surface on which the UV light reducer S is provided becomes stronger in the convex direction, the light beam exit angle from the lens surface becomes larger, and it becomes difficult to maintain the characteristic of the UV light reducer S.

Inequality (5) defines a ratio of the focal length of the lens including the UV light reducer S to the focal length of the entire optical system. In a case where the value becomes higher than the upper limit of inequality (5), the refractive power of the lens having the UV light reducer S becomes weaker, and an unnecessary design of the optical system occurs. On the other hand, in a case where the value becomes lower than the lower limit of inequality (5), the refractive power of the lens having the UV light reducer S becomes stronger, the lens curvature becomes stronger, the light beam exit angle relative to the curved surface becomes larger, and thereby it becomes difficult to maintain the characteristic of the UV light reducer.

Inequality (6) defines the refractive index of the resin lens P for the d-line. In a case where the value becomes higher than the upper limit of inequality (6), it becomes difficult to correct the Petzval sum of the optical system and optical performance such as curvature of field or astigmatism deteriorates. On the other hand, in a case where the value becomes lower than the lower limit of inequality (6), the lens curvature becomes too steep and the spherical aberration etc. increases.

Inequality (7) defines the Abbe number of the resin lens P based on the d-line. In a case where the value becomes higher than the upper limit of inequality (7), the dispersion in the resin lens P becomes weaker, and it becomes difficult to correct chromatic aberration of the optical system. On the other hand, in a case where the value becomes lower than the lower limit of inequality (7), chromatic aberration becomes overcorrected.

Inequalities (3) to (7) may be replaced with the following inequalities (3a) to (7a), respectively:

$$0 < Tv1 < 8 \tag{3a}$$

$$-1.00 < h*EP/(Re*f) < 0.30 \tag{4a}$$

$$0.5 < fuv/f < 8.0 \tag{5a}$$

$$1.60 < ndp < 1.70 \tag{6a}$$

$$17.0 < vdp < 25.0 \tag{7a}$$

Inequalities (3) to (7) may be replaced with the following inequalities (3b) to (7b), respectively:

$$0 < Tv1 < 3 \tag{3b}$$

$$-0.70 < h*EP/(Re*f) < 0.10 \tag{4b}$$

$$0.5 < fuv/f < 5.0 \tag{5b}$$

$$1.62 < ndp < 1.70 \tag{6b}$$

$$19.0 < vdp < 25.0 \tag{7b}$$

Figure 9:
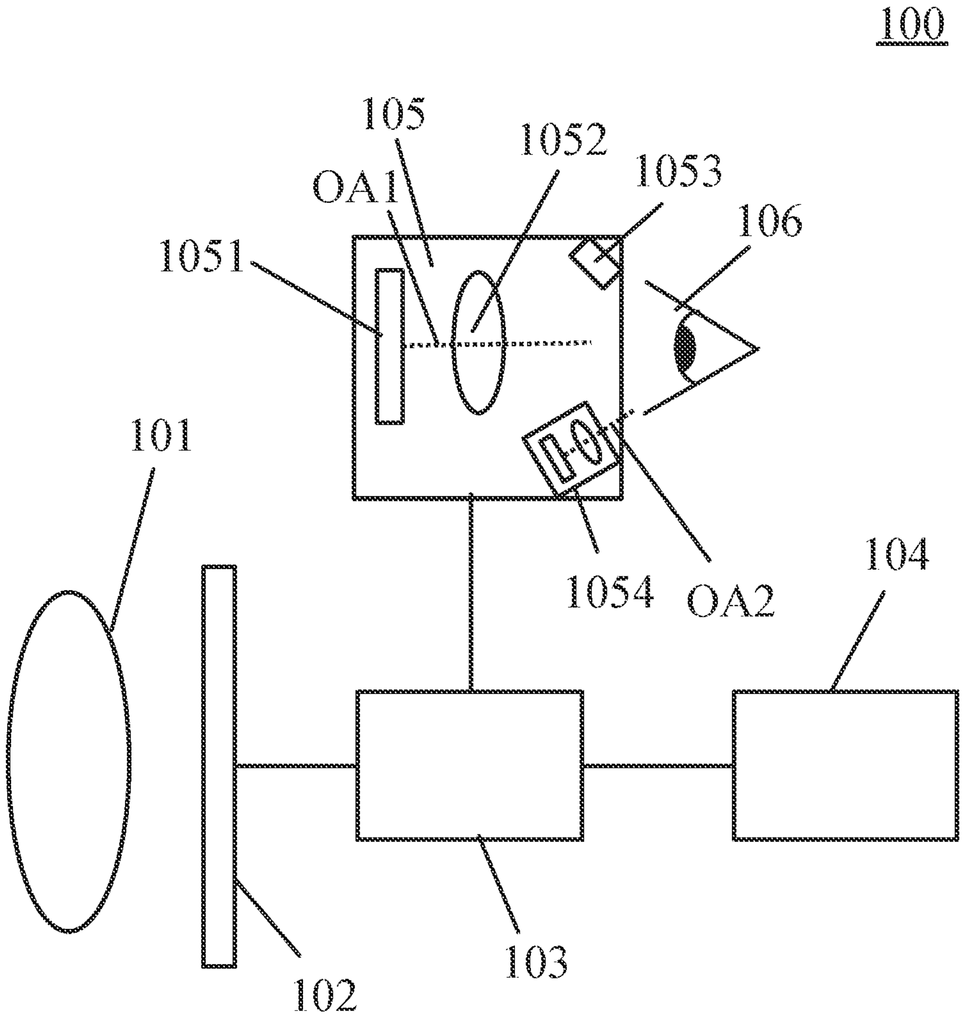
FIG. 9 is a schematic diagram of an image pickup apparatus having an optical system according to each example.

The imaging unit for line-of-sight detection may have an optical axis (optical path) disposed at an angle different from that of the optical system (viewfinder optical system), and the imaging unit and viewfinder optical system may not share a lens in each optical path (see FIG. 9). This prevents unnecessary space in the optical path of the viewfinder optical system, wasteful design, or deterioration of the optical performance in a case where the optical axis and optical path of the viewfinder optical system and the imaging unit are shared. In particular, the higher the magnification of the viewfinder optical system, the shorter the focal length of the entire system becomes, so the overall length of the optical system must be shortened.

The UV light reducer S may include a vapor deposited film containing dielectric or metal oxide, and the vapor deposited film may include 17 layers or less. The UV light reducer S may use material absorption or a vapor deposited film. In a case where the material absorption is used, there is almost no degree of freedom of the property, but the vapor deposited film is likely to provide the desired property. As the number of vapor deposited layers increases, the desired characteristic is likely to be acquired. On the other hand, as the number of layers increases, cracks tend to occur in the film, and it becomes difficult to suppress manufacturing sensitivity. Therefore, the film may use the minimum necessary number of vapor deposited layers. The UV light reducer S using the vapor-deposited film may be realized by a UV reflection film or a UV absorption film.

Next follows numerical examples 1 to 3 corresponding to Examples 1 to 3 are illustrated in Tables 1A, 1B, 2A, 2B, 3A, and 3B. Tables 1A and 1B summarize numerical example 1, Tables 2A and 2B summarize numerical example 2, and Tables 3A and 3B summarize numerical example 3, respectively. In each numerical example, r represents a radius of curvature, d represents a distance between surfaces, and nd and vd represent a refractive index for the d-line and an Abbe number based on the d-line, respectively. di represents a distance between on i-th and (i+1)-th surfaces, where i is a surface number counted from the object side to the observation side. In each numerical example, a surface whose numerical value is written in aspherical surface data has an aspherical shape defined by the following equation.

$$x = \frac{\frac{h^2}{r}}{1 + \sqrt{1 - (1 + K)\left(\frac{h}{r}\right)^2}} + A2 \cdot h^2 + A4 \cdot h^4 + A6 \cdot h^6 + A8 \cdot h^8 + A10 \cdot h^{10} + A12 \cdot h^{12}$$

where x is a distance in the optical axis direction from a vertex of a lens surface, h is a height in the direction perpendicular to the optical axis, r is a paraxial radius of curvature at the vertex of the lens surface, K is a conic constant, A2, A4, A6, A8, A10, and A12 are polynomial coefficients.

Table 4 summarizes values of inequalities (4) and (5) in numerical examples 1 to 3.

Figure 7:
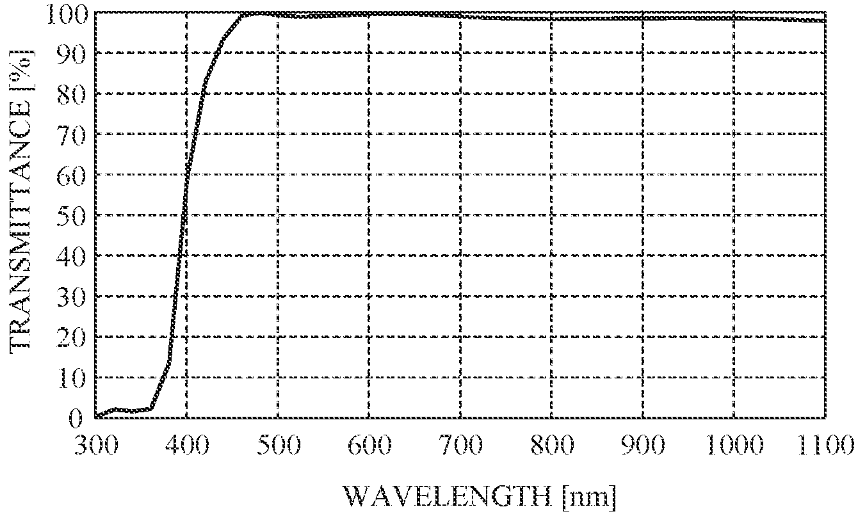
FIG. 7 is a transmittance characteristic diagram of an ultraviolet light reducer according to Example 4.
Figure 8:
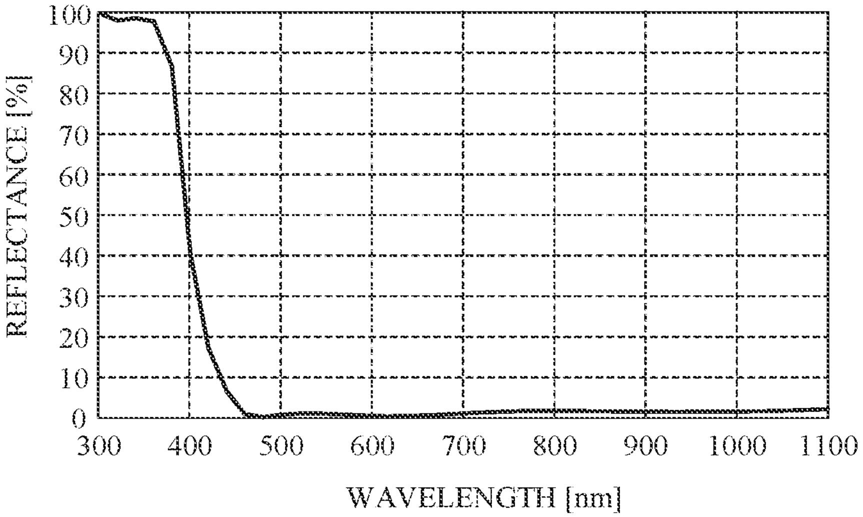
FIG. 8 is a reflectance characteristic diagram of the ultraviolet light reducer according to Example 4.

Referring now to FIGS. 7 and 8, a description will be given of Example 4. In this example, the UV light reducer S includes a multilayer film. FIG. 7 is a transmittance characteristic diagram of the UV light reducer S in this example. In FIG. 7, a horizontal axis represents wavelength [nm], and a vertical axis represents transmittance [%]. FIG. 8 is a reflectance characteristic diagram of the UV light reducer S in this example. In FIG. 8, a horizontal axis represents wavelength [nm], and a vertical axis represents reflectance [%]. Table 5 summarizes numerical example 4 corresponding to this example.

Referring now to FIG. 9, a description will be given of an image pickup apparatus 100 including the optical system (viewfinder optical system) according to any one of the examples. FIG. 9 is a schematic diagram of the image pickup apparatus 100 including the optical system according to any one of the examples. The image pickup apparatus 100 includes an imaging optical system 101, an image sensor 102, an image processing circuit 103, a recording medium 104, and an observation apparatus (display apparatus) 105.

An object image formed by the imaging optical system 101 is converted into an electrical signal by the image sensor 102. The image sensor 102 is a photoelectric conversion element such as a CCD sensor or a CMOS sensor. The image processing circuit 103 processes the electrical signal output from the image sensor 102 and generates an image (image data). The recording medium 104 is a semiconductor memory, a magnetic tape, an optical disc, or the like, and records an image generated by the image processing circuit 103. The image generated by the image processing circuit 103 is displayed on the observation apparatus 105 including the optical system according to any one of the above examples.

The observation apparatus 105 includes an image display element 1051, a viewfinder optical system 1052 (corresponding to the optical system according to each example), an illumination system 1053 that illuminates the viewer's eyeball 106, and an imaging unit 1054 that images the viewer's eyeball. The image display element 1051 is a liquid crystal display element, an organic EL, or the like. The illumination system 1053 is disposed to illuminate the viewer's eyeball, and is an LED or the like. Near-infrared light may be used for the illumination wavelength of the illumination system 1053 so that the viewer does not feel uncomfortable. The image sensor 1055 is a CCD sensor or a CMOS sensor. The imaging optical system 101 that images the viewer's eyeball 106 can be located at any position as long as it is outside the optical path of the viewfinder optical system 1052. The image pickup apparatus 100 may be disposed below the image pickup apparatus 100 while interference with other components is avoided since the image pickup apparatus 100 is prevented from becoming higher.

As illustrated in FIG. 9, an optical axis OA2 of the imaging unit 1054 and an optical axis OA1 of the viewfinder optical system 1052 may be disposed at different angles from each other, and the imaging unit 1054 and the viewfinder optical system 1052 may not share a lens.

Thus, each example can apply the observation apparatus 105 having the viewfinder optical system 1052 to the image pickup apparatus 100 such as a digital camera or a video camera. Thereby, this example can provide an optical system that has a line-of-sight detecting function, a wide field angle, a long eyepoint, and high optical performance as a viewfinder. Therefore, each example can provide an optical system, a display apparatus, and an image pickup apparatus, each of which has high optical performance and high reliability.

TABLE 1A

| | |
|---|---|
| Focal Length f | 20.37 |
| Display Diagonal Length 2h | 16.4 |
| 2ω [deg] | 43.4 |

UNIT: mm
Surface Data

| Surface No. | r | d | nd | νd |
|---|---|---|---|---|
| 1 | (Display Surface) | 0.7 | 1.52100 | 65.12 |
| 2 | ∞ | (Variable) | | |
| 3 | −16.5374 | 4.5989 | 1.53500 | 55.73 |
| 4 | −12.8300 | 0.3000 | | |
| 5 | 75.0000 | 6.4000 | 1.76802 | 49.24 |
| 6 | −16.9577 | 3.1307 | | |
| 7 | −9.8844 | 2.2000 | 1.63550 | 23.89 |
| 8 | −238.6904 | 0.8304 | | |
| 9 | −36.0771 | 6.5000 | 1.53500 | 55.73 |
| 10 | −13.8581 | 0.3000 | | |
| 11 | −5000 | 3.0189 | 1.76802 | 49.24 |
| 12 | −40.70098 | 25.0000 | | |
| EP | Observation Surface | | | |

TABLE 1B

ASPHERIC DATA

| | 3rd Surface | 4th Surface | 5th Surface | 6th Surface | 7th Surface | 8th Surface |
|---|---|---|---|---|---|---|
| K | 0.0000E+00 | 0.0000E+00 | 0.0000E+00 | 4.1632E−01 | −4.2047E−01 | 0.0000E+00 |
| A4 | 1.6255E−04 | 2.9380E−04 | 0.0000E+00 | −2.4800E−05 | 1.3033E−04 | 4.4826E−05 |
| A6 | −3.9953E−06 | −2.1388E−06 | 0.0000E+00 | 1.4784E−06 | 7.1699E−07 | −3.6299E−07 |
| A8 | 8.0123E−08 | 2.0108E−08 | 0.0000E+00 | −1.2065E−08 | −9.4556E−09 | −3.7443E−10 |
| A10 | −4.6480E−10 | 6.8527E−11 | 0.0000E+00 | 3.9822E−11 | 4.0473E−11 | 1.0412E−11 |
| A12 | 6.5285E−13 | −7.3391E−13 | 0.0000E+00 | 0.0000E+00 | 0.0000E+00 | −2.7155E−14 |

| | 9th Surface | 10th Surface | 11th Surface | 12th Surface |
|---|---|---|---|---|
| K | 0.0000E+00 | −1.3497E−01 | 0.0000E+00 | 2.6238E−01 |
| A4 | 2.6291E−04 | 1.2223E−04 | −1.1597E−04 | −1.1241E−04 |
| A6 | −2.1049E−06 | −2.1517E−07 | 1.3880E−07 | 4.3361E−07 |
| A8 | 5.3700E−09 | −1.9690E−09 | 1.7953E−09 | −1.0191E−09 |
| A10 | 1.5542E−11 | 1.9993E−11 | −4.9552E−12 | 3.4455E−12 |
| A12 | −8.1213E−14 | −3.8506E−14 | −1.4248E−16 | −3.5396E−15 |

Variable Distance

| | | | |
|---|---|---|---|
| Diopter [dptr] | −1.0 | −4.3 | 2.3 |
| d2 | 5.0932 | 3.6283 | 6.4498 |

Focal Length of Each Lens

| | |
|---|---|
| f1 | 74.6821 |
| f2 | 18.5695 |
| f3 | −16.2863 |
| f4 | 38.1670 |
| f5 | 53.4155 |

TABLE 2A

| | |
|---|---|
| Focal Length f | 20.28 |
| Display Diagonal Length 2h | 16.4 |
| 2ω [deg] | 43.0 |

UNIT: mm
Surface Data

| Surface No. | r | d | nd | νd |
|---|---|---|---|---|
| 1 | (Display Surface) | 0.5 | 1.52100 | 65.12 |
| 2 | ∞ | (Variable) | | |
| 3 | −15.3925 | 1.0000 | 1.63540 | 23.89 |
| 4 | −419.9039 | 0.9118 | | |
| 5 | 34.7807 | 6.2711 | 1.76802 | 49.24 |
| 6 | −13.6258 | 3.8608 | | |
| 7 | 418.8448 | 4.4244 | 1.76802 | 49.24 |
| 8 | −32.0026 | 3.2349 | | |
| 9 | −7.7897 | 2.8603 | 1.63540 | 23.89 |
| 10 | 160.2910 | 1.7200 | | |
| 11 | 26.11204 | 5.4551 | 1.85135 | 40.10 |
| 12 | −24.97609 | 25.0000 | | |
| EP | Observation Surface | | | |

TABLE 2B

ASPHERIC DATA

| | 3rd Surface | 4th Surface | 5th Surface | 6th Surface | 7th Surface | 8th Surface |
|---|---|---|---|---|---|---|
| K | −1.2588E+00 | 0.0000E+00 | 0.0000E+00 | −1.5016E+00 | 6.6715E+02 | 0.0000E+00 |
| A4 | −8.7363E−05 | 0.0000E+00 | 0.0000E+00 | 1.0468E−04 | 1.2856E−04 | 0.0000E+00 |
| A6 | 4.4000E−06 | 0.0000E+00 | 0.0000E+00 | −8.4209E−08 | −1.0381E−06 | 0.0000E+00 |
| A8 | −6.7032E−08 | 0.0000E+00 | 0.0000E+00 | −2.7270E−09 | 1.7509E−09 | 0.0000E+00 |
| A10 | 3.6615E−10 | 0.0000E+00 | 0.0000E+00 | 1.5238E−11 | 6.6691E−12 | 0.0000E+00 |
| A12 | 0.0000E+00 | 0.0000E+00 | 0.0000E+00 | 0.0000E+00 | 0.0000E+00 | 0.0000E+00 |

| | 9th Surface | 10th Surface | 11th Surface | 12th Surface |
|---|---|---|---|---|
| K | −3.3240E+00 | 1.2753E+02 | −2.8505E+01 | 0.0000E+00 |
| A4 | 2.8891E−07 | 1.2234E−04 | −3.5613E−05 | 0.0000E+00 |
| A6 | 6.9607E−09 | −8.3623E−07 | 3.2974E−07 | 0.0000E+00 |
| A8 | −9.5623E−10 | 6.1525E−10 | −2.5953E−09 | 0.0000E+00 |
| A10 | 2.6218E−12 | 4.9857E−12 | 6.4925E−12 | 0.0000E+00 |
| A12 | 0.0000E+00 | 0.0000E+00 | 0.0000E+00 | 0.0000E+00 |

Variable Distance

| | | | |
|---|---|---|---|
| Diopter [dptr] | −1.0 | −4.0 | 2.0 |
| d2 | 4.5465 | 4.9648 | 3.2045 |

Focal Length of Each Lens

| | |
|---|---|
| f1 | −25.1707 |
| f2 | 13.5076 |
| f3 | 38.8769 |
| f4 | −11.6145 |
| f5 | 15.7690 |

TABLE 3A

| | |
|---|---|
| Focal Length f | 18.7 |
| Display Diagonal Length 2h | 12.9 |
| 2ω [deg] | 37.5 |

UNIT: mm
Surface Data

| Surface No. | r | d | nd | νd |
|---|---|---|---|---|
| 1 | (Display Surface) | 0.7 | 1.52100 | 65.12 |
| 2 | ∞ | (Variable) | | |
| 3 | 293.271 | 4.22 | 1.76802 | 49.24 |
| 4 | −10.650 | 2.47 | | |
| 5 | −6.287 | 2.20 | 1.63480 | 23.89 |
| 6 | −35.477 | 0.35 | | |
| 7 | 667.096 | 6.00 | 1.53500 | 55.73 |
| 8 | −13.698 | 0.30 | | |
| 9 | −83.497 | 3.60 | 1.53500 | 55.73 |
| 10 | −18.473 | 25.00 | | |
| EP | Observation Surface | | | |

TABLE 3B

| | ASPHERIC DATA | | | | | |
|---|---|---|---|---|---|---|
| | 3rd Surface | 4th Surface | 5th Surface | 6th Surface | 7th Surface | 8th Surface |
| K | 0.000E+00 | −8.499E−01 | −9.238E−01 | 0.000E+00 | 0.000E+00 | −3.551E+00 |
| A2 | 0.000E+00 | 0.000E+00 | 0.000E+00 | 4.479E−04 | 0.000E+00 | 0.000E+00 |
| A4 | 0.000E+00 | 1.369E−04 | 5.365E−04 | 2.798E−04 | 0.000E+00 | −1.178E−04 |
| A6 | 0.000E+00 | −4.091E−07 | −6.074E−06 | −2.653E−06 | 0.000E+00 | 2.524E−07 |
| A8 | 0.000E+00 | 3.338E−09 | 3.520E−08 | 9.209E−09 | 0.000E+00 | −1.687E−09 |
| A10 | 0.000E+00 | 0.000E+00 | −3.178E−10 | −7.871E−12 | 0.000E+00 | 4.351E−12 |

| | 9th Surface | 10th Surface |
|---|---|---|
| K | 0.000E+00 | −1.470E+00 |
| A2 | 0.000E+00 | 0.000E+00 |
| A4 | 0.000E+00 | −9.037E−06 |
| A6 | 0.000E+00 | −2.058E−07 |
| A8 | 0.000E+00 | 1.532E−09 |
| A10 | 0.000E+00 | −1.872E−12 |

Variable Distance

| Diopter [dpt] | −4.0 | −1.0 | +2.0 |
|---|---|---|---|
| d2 | 6.1846 | 7.0382 | 8.0835 |

Focal Length of Each Lens

| | |
|---|---|
| f1 | 13.4624 |
| f2 | −12.3006 |
| f3 | 25.1659 |
| f4 | 43.5000 |

TABLE 4

| | Inequality (4) h * EP/(Re * f) | Inequality (5) fuv/f |
|---|---|---|
| EXAMPLE 1 | −0.2474 | 2.6217 |
| EXAMPLE 2 | −0.4049 | 0.7774 |
| EXAMPLE 3 | −0.4666 | 2.3253 |

TABLE 5

| | Refractive Index | Film Thickness [nm] |
|---|---|---|
| Base Material | 1.77 | — |
| 1 | 2.32 | 10.0 |
| 2 | 1.46 | 43.9 |
| 3 | 2.32 | 23.8 |
| 4 | 1.46 | 46.6 |
| 5 | 2.32 | 29.3 |
| 6 | 1.46 | 33.9 |
| 7 | 2.32 | 44.3 |
| 8 | 1.46 | 26.5 |
| 9 | 2.32 | 50.4 |
| 10 | 1.46 | 35.1 |
| 11 | 2.32 | 29.2 |
| 12 | 1.46 | 120.3 |

While the disclosure has described example embodiments, it is to be understood that some embodiments are not limited to the disclosed embodiments. The scope of the following claims is to be accorded the broadest interpretation so as to encompass all such modifications and equivalent structures and functions.

Each example can provide an optical system with high optical performance and high reliability.

This application claims the benefit of Japanese Patent Application No. 2023-020466, which was filed on Feb. 14, 2023, and which is hereby incorporated by reference herein in its entirety.

What is claimed is:

1. An optical system configured to guide an image displayed on a display element to an eyeball of a viewer, the optical system comprising:

a resin lens; and a member for reducing transmission of ultraviolet light of the optical system, wherein the member is disposed closer to the viewer than the resin lens, wherein the member is disposed on an optical surface of the optical system closest to the viewer, and wherein the following inequalities are satisfied:

$$0 < Tuv < 10$$

$$0 < Rir < 10$$

$$-1.00 < h*EP/(\mathrm{Re}*f) < 0.50$$

where Tuv [%] is an average transmittance of the member at a wavelength of 300 to 360 nm, Rir [%] is an average reflectance of the member at a wavelength of 700 to 1000 nm, and Re is a curvature of the optical surface, f is a focal length of the optical system, h is a diagonal length of a display surface of the display element, and EP is an eyepoint distance of the optical system.

2. The optical system according to claim 1, wherein the following inequality is satisfied:

$$0 < Tvl < 10$$

where Tvl [%] an average reflectance of the member at a wavelength of 400 to 700 nm.

3. The optical system according to claim 1, further comprising an imaging unit configured to image the eyeball using infrared light.

4. The optical system according to claim 3, wherein an optical axis of the imaging unit and an optical axis of the optical system are disposed at different angles from each other, and wherein the imaging unit and the optical system do not share a lens.

5. The optical system according to claim 1, wherein the member includes a vapor deposited film made of dielectric or metal oxide, and wherein the vapor deposited film includes 17 layers or less.

6. The optical system according to claim 1, wherein the following inequalities are satisfied:

$$1.60 < ndp < 1.75$$

$$15.0 < vdp < 25.0$$

where ndp is a refractive index of the resin lens for d-line, and vdp is an Abbe number based on the d-line.

7. An optical system configured to guide an image displayed on a display element to an eyeball of a viewer, the optical system comprising:

a resin lens; and a member for reducing transmission of ultraviolet light of the optical system, wherein the member is disposed closer to the viewer than the resin lens, and wherein the following inequalities are satisfied:

$$0 < Tuv < 10$$

$$0 < Rir < 10,$$

$$0.5 < fuv/f < 10.0$$

where Tuv [%] is an average transmittance of the member at a wavelength of 300 to 360 nm, Rir [%] is an average reflectance of the member at a wavelength of 700 to 1000 nm, and fuv is a focal length of a lens including the member, and f is a focal length of the optical system.

8. A display apparatus comprising:

a display element; and an optical system configured to guide an image displayed on the display element to an eyeball of a viewer, wherein the optical system includes:

a resin lens; and a member for reducing transmission of ultraviolet light of the optical system, wherein the member is disposed closer to the viewer than the resin lens, wherein the member is disposed on an optical surface of the optical system closest to the viewer, and wherein the following inequalities are satisfied:

$$0 < Tuv < 10$$

$$0 < Rir < 10$$

$$-1.00 < h*EP/(\mathrm{Re}*f) < 0.50$$

where Tuv [%] is an average transmittance of the member at a wavelength of 300 to 360 nm, Rir [%] is an average reflectance of the member at a wavelength of 700 to 1000 nm, and Re is a curvature of the optical surface, f is a focal length of the optical system, h is a diagonal length of a display surface of the display element, and EP is an eyepoint distance of the optical system.

9. The display apparatus according to claim 8, wherein the following inequality is satisfied:

$$0 < Tvl < 10$$

where Tvl [%] an average reflectance of the member at a wavelength of 400 to 700 nm.

10. The display apparatus according to claim 8, further comprising an imaging unit configured to image the eyeball using infrared light.

11. The display apparatus according to claim 8, wherein the following inequalities are satisfied:

$$1.60 < ndp < 1.75$$

$$15.0 < vdp < 25.0$$

where ndp is a refractive index of the resin lens for d-line, and vdp is an Abbe number based on the d-line.

12. A display apparatus comprising:

a display element; and an optical system configured to guide an image displayed on the display element to an eyeball of a viewer, wherein the optical system includes:

a resin lens; and a member for reducing transmission of ultraviolet light of the optical system, wherein the member is disposed closer to the viewer than the resin lens, wherein the following inequalities are satisfied:

$$0 < Tuv < 10$$

$$0 < Rir < 10$$

$$0.5 < fuv/f < 10.0$$

where Tuv [%] is an average transmittance of the member at a wavelength of 300 to 360 nm, Rir [%] is an average reflectance of the member at a wavelength of 700 to 1000 nm, and fuv is a focal length of a lens including the member, and f is a focal length of the optical system.

13. An image pickup apparatus comprising:

a display apparatus; and an image sensor;

wherein the display apparatus comprising:

a display element; and an optical system configured to guide an image displayed on the display element to an eyeball of a viewer, wherein the optical system includes:

a resin lens; and a member for reducing transmission of ultraviolet light of the optical system, wherein the member is disposed closer to the viewer than the resin lens, wherein the member is disposed on an optical surface of the optical system closest to the viewer, and wherein the following inequalities are satisfied:

$$0 < Tuv < 10$$

$$0 < Rir < 10$$

$$-100 < h * EP/(\mathrm{Re} * f) < 0.50$$

where Tuv [%] is an average transmittance of the member at a wavelength of 300 to 360 nm, Rir [%] is an average reflectance of the member at a wavelength of 700 to 1000 nm, and Re is a curvature of the optical surface, f is a focal length of the optical system, h is a diagonal length of a display surface of the display element, and EP is an eyepoint distance of the optical system.

14. The image pickup apparatus according to claim 13, wherein the following inequality is satisfied:

$$0 < Tvl < 10$$

where Tvl [%] an average reflectance of the member at a wavelength of 400 to 700 nm.

15. The image pickup apparatus according to claim 13, further comprising an imaging unit configured to image the eyeball using infrared light.

16. The image pickup apparatus according to claim 13, wherein the following inequalities are satisfied:

$$1.60 < ndp < 1.75$$

$$15.0 < vdp < 25.0$$

where ndp is a refractive index of the resin lens for d-line, and vdp is an Abbe number based on the d-line.

17. An image pickup comprising:

a display apparatus; and an image sensor;

wherein the display apparatus comprising:

a display element; and an optical system configured to guide an image displayed on the display element to an eyeball of a viewer, wherein the optical system includes:

a resin lens; and a member for reducing transmission of ultraviolet light of the optical system, wherein the member is disposed closer to the viewer than the resin lens, and wherein the following inequalities are satisfied:

$$0 < Tuv < 10$$

$$0 < Rir < 10$$

$$0.5 < fuv/f < 10.0$$

where Tuv [%] is an average transmittance of the member at a wavelength of 300 to 360 nm, Rir [%] is an average reflectance of the member at a wavelength of 700 to 1000 nm, and fuv is a focal length of a lens including the member, and f is a focal length of the optical system.

* * * * *